United States Patent
Ravenda et al.

(10) Patent No.: US 8,114,175 B2
(45) Date of Patent: Feb. 14, 2012

(54) FUEL CELL HYDROCARBON REFORMER HAVING RAPID TRANSIENT RESPONSE AND CONVECTIVE COOLING

(75) Inventors: Francois Ravenda, Longwy (FR); Patrick Valente, Itzig (LU); John E. Kirwan, Troy, MI (US); Guilio A. Ricci-Ottati, Burton, MI (US)

(73) Assignee: Delphi Technologies, Inc., Troy, MI (US)

( * ) Notice: Subject to any disclaimer, the term of this patent is extended or adjusted under 35 U.S.C. 154(b) by 792 days.

(21) Appl. No.: 12/228,613

(22) Filed: Aug. 14, 2008

(65) Prior Publication Data

US 2010/0040919 A1  Feb. 18, 2010

(51) Int. Cl.
*C01B 3/08* (2006.01)
*H01M 8/06* (2006.01)

(52) U.S. Cl. ............................................. 48/61

(58) Field of Classification Search ................ None
See application file for complete search history.

*Primary Examiner* — Melvin Mayes
*Assistant Examiner* — Colin W Slifka
(74) *Attorney, Agent, or Firm* — Thomas N. Twomey

(57) ABSTRACT

A catalytic hydrocarbon reformer comprising a catalyst concentrically disposed within a reformer tube surrounded by an annular flow space for air entering a fuel-air mixing zone ahead of the catalyst. The catalyst is sustained by minimal insulative mounting material so that most of the side of the catalyst is exposed for radial radiative heat transfer to the reformer tube for cooling by air in the annular flow space. The forward portion of the mounting material preferably is formed of a thermally-conductive material to provide radial conductive cooling of the entry of the catalyst to prevent overheating during catalysis. The incoming air flow is protected from heat exchange with hot reformate exiting the catalyst, allowing for convective cooling of the catalyst side and greater cooling of the catalyst face, thus increasing the working life of the catalyst while providing for rapid startup of the reformer and associated fuel cell system.

4 Claims, 2 Drawing Sheets

FUEL CELL HYDROCARBON REFORMER HAVING RAPID TRANSIENT RESPONSE AND CONVECTIVE COOLING

TECHNICAL FIELD

The present invention relates to catalytic hydrocarbon reformers for providing hydrogen and carbon monoxide fuels; more particularly, to such reformers wherein incoming fuel and air are heated by extracting heat from formed reformate exiting the reformer; and most particularly, to a reformer wherein heating of incoming air is accomplished by extraction mostly of heat from the catalytic element itself.

BACKGROUND OF THE INVENTION

Catalytic hydrocarbon reformers for converting air and hydrocarbon fuels into molecular hydrogen and carbon monoxide (reformate) as gaseous fuels for use in, for example, solid oxide fuel cells (SOFCs) are well known.

Fuel-air mixture preparation in catalytic reformers is a key factor in fuel efficiency and reformer life. Inhomogeneous mixtures can lead to decreased reforming efficiency and reduced reformer catalyst durability through coke/soot formation on the catalyst and thermal degradation from local hot spots.

Complete and rapid fuel vaporization is a key step to achieving a homogeneous fuel-air mixture. Fuel vaporization is especially challenging under reformer cold-start and warm-up conditions. In prior art technologies, such as vaporization via a preheated air stream, vaporization from a heated reformer surface, or vaporization via "cool flames", the overall startup time to the beginning of electric generation by the associated fuel cell can be undesirably extended and overall system efficiency can be substantially reduced compared to under steady-state conditions.

What is needed in the art is an improved heat transfer arrangement that provides greater and faster transfer of heat from a catalyst brick to the incoming air and/or fuel stream to cause more rapid and more complete vaporization of fuel earlier in the startup phase of reformer/fuel cell operation.

It is a principal object of the present invention to improve fuel efficiency, to increase catalyst life, and to shorten start-up time in a catalytic hydrocarbon fuel reformer.

SUMMARY OF THE INVENTION

Briefly described, the present invention comprises a catalyst brick concentrically disposed within a reformer tube which itself is disposed concentrically within an off-spaced housing, thereby defining an annular flow space between the reformer tube and the housing for air entering a fuel-air mixing zone ahead of the catalyst brick. The catalyst brick is sustained within the reformer tube by minimal mounting material; thus, most of the side of the catalyst brick is exposed for radial radiative heat transfer to the reformer tube and hence to cooling air in the annular flow space. Preferably, the forward portion of the mounting material is formed of a highly conductive material such as wire rope to provide a high level of radial conductive cooling of the entry portion of the catalyst brick which is known in the art to suffer degradation from localized overheating during catalysis. Preferably, the hot reformate exiting the catalyst sees reduced heat exchange with the incoming air flow compared to the prior art. Thus, incoming air can convectively cool the longitudinal side of the catalyst brick and allowing for reduced temperature of the face of the catalyst brick, thus increasing the working life of the catalyst brick while providing for more complete and more rapid fuel vaporization and hence more rapid startup of the reformer and associated fuel cell system.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
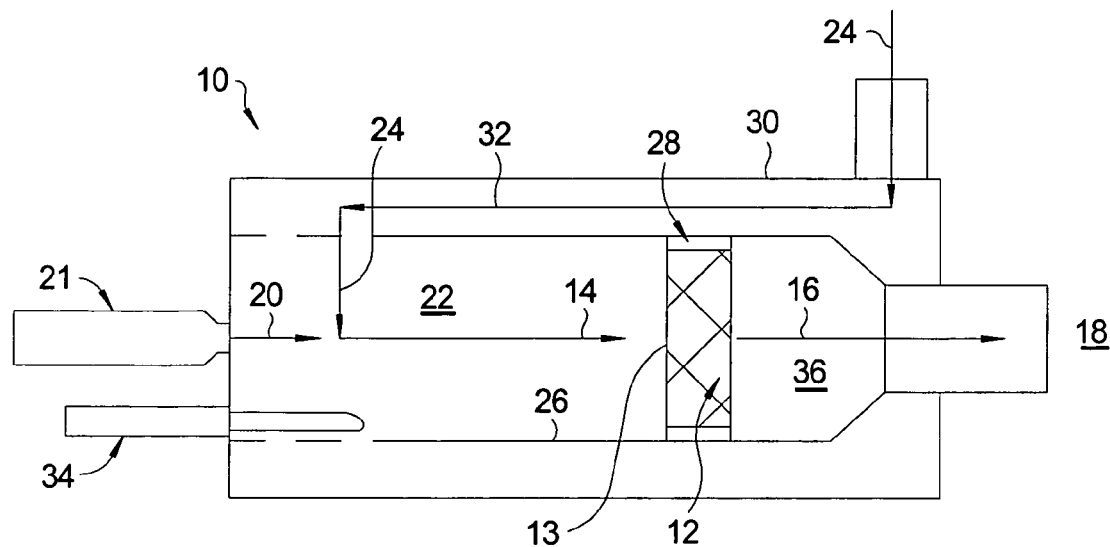
FIG. 1 is a schematic longitudinal cross-sectional view of a prior art catalytic hydrocarbon reformer.

Referring to FIG. 1, a typical prior art catalytic hydrocarbon reformer 10, such as used for supplying reformate to a SOFC system, is shown. Reformer 10 comprises a catalytic element 12, typically a porous or channeled monolithic element known in the art as a "brick", for converting a mixture 14 of hydrocarbons and oxygen to a reformate gas 16 containing molecular hydrogen and carbon monoxide. Reformate typically is used as a fuel in the SOFC 18 to generate electricity and heat. Fuel 20 is injected by a fuel injector 21 into a mixing zone 22 where it mixes with incoming air 24 to form mixture 14. Catalytic element 12 is mounted within a typically cylindrical reformer tube 26 from which element 12 is sustained and centered by a material 28 that completely surrounds the reforming catalyst. An outer housing 30 defines an annular space 32 for passage of incoming air 24. An igniter 34 extends into mixing zone 22 for ignition of mixture 14 during cold startup as described below.

In prior art reformer 10, heat transfer from catalyst brick 12 to the reformer walls 26 is severely restricted by mat material 28. Reformer warm-up for fuel-air mixture preparation is chiefly achieved via counter-flow heat exchange between the hot reformate gas 16 exiting the reformer and the incoming air flow 24. Radiation heat exchange from the front face 13 catalyst brick 12 into the fuel-air mixture 14 in mixing zone 22 is possible, and tests show that it can significantly increase the reformer heat-up rate. However, such heating requires exposing a high temperature catalyst surface directly to the incoming fuel-air mixture, which can lead to undesirable pre-ignition and gas phase combustion in the reformer mixing zone during reforming. Such gas phase combustion under reforming conditions is unacceptable because it leads to poor reforming efficiency and production of sooty deposits in the reformer.

In operation, during initial start-up, fuel and air are burned in the mixing zone by ignition the mixture with igniter 34. This combustion phase provides the initial energy required to light-off the reforming catalyst and heats the fuel-air mixing zone 22 to assist fuel vaporization.

After a predetermined warm-up period, combustion is quenched and a very rich fuel-air mixture is supplied to initiate reformate production. The atomized fuel evaporates and mixes with the airflow within mixing zone 22 prior to reacting within catalyst 12. The energy generated during the reforming process (exothermic reaction) continues to heat the reformer, including the heat exchange section 36 downstream of the reforming catalyst. Under warmed up operation, heat exchange section 36 transfers heat from the hot reformate gas 16 to incoming air flow 24. This heat transfer provides energy to the mixing zone to assist fuel vaporization.

After the end of combustion but before the reformer is warmed up, a deficit in heat energy for fuel vaporization develops. This deficit arises because the heat energy stored in the mixing section 22 of the reformer during the combustion process is depleted by reforming before the heat exchange section 36 warms up sufficiently to provide substantial heat from the reforming process. The extent and duration of this deficit is dependent on a number of factors including the heat generated and stored during combustion, the thermal mass of the catalyst and heat exchange section and the heat transfer rates within the reformer. The maximum temperature that the brick face 13 can sustain (approximately 1100° C. to 1200° C.) is a practical limit to prevent thermal degradation of the catalyst, which limits combustion duration and thus controls the amount of stored energy available for fuel vaporization during early reforming.

Providing a compact reformer that provides sufficient volume, residence time, and heat to accomplish good fuel air mixture preparation is a significant challenge. Especially during warm-up, the heat deficit described above results in incomplete fuel vaporization. Consequent fuel puddling leads to excursions in fuel-air composition and volume that impact reformer efficiency and durability. A second challenge is thermal management of the reforming catalyst to prevent excessively high temperatures in the catalyst brick that can rapidly degrade catalyst function and shorten durability.

Figure 2:
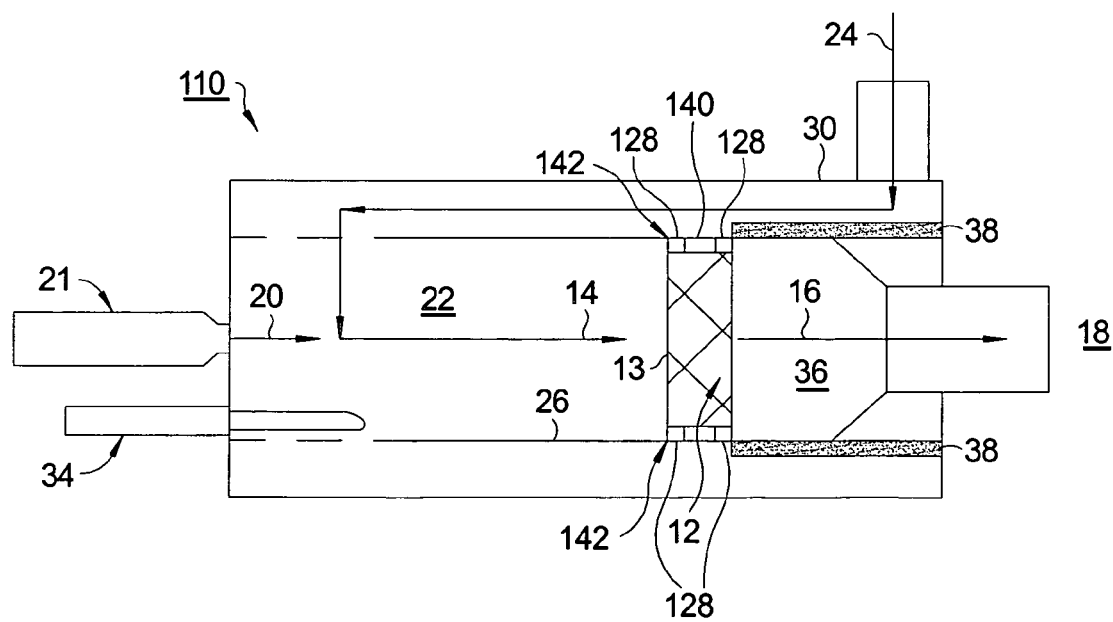
FIG. 2 is a schematic longitudinal cross-sectional view of a catalytic hydrocarbon reformer in accordance with the present invention.

Referring now to FIG. 2, compared to prior art reformer 10, improved reformer 110 can eliminate the heat deficit by using direct radiation and/or conduction of heat from catalyst brick 12 itself, rather than from the reformate as in the prior art, which enables more rapid coupling of energy from the exothermic reforming process back into mixing zone 22 for good mixture preparation. Improved reformer 110 also provides a direct path for cooling catalyst brick face 13 to prevent thermal degradation of the catalyst. Overall, more heat must be rejected from the exothermic partial oxidation reforming process than is necessary for good mixture preparation; therefore, the invention further provides convective cooling of the reformer mixing zone walls to reject the extra heat and to prevent degradation and failure of the reformer wall materials from excessive temperatures that this direct coupling can create.

FIG. 2 includes all aspects of the present invention. To highlight the changes compared to prior art reformer 10 shown in FIG. 1, the schematic overall shape of the reformer is unchanged. It is important to note that the invention is not restricted to this reformer arrangement, and novel thermal management techniques are generally applicable to a wide variety of reformer shapes and arrangements employing exothermic reactions.

Improved reformer 110 allows direct conduction and/or radiation from catalyst brick 12 into mixing zone 22 to provide the heat required for good fuel-air mixture preparation. Compared to prior art reformer 10, a portion of material 28 is removed, leaving material 128 extending over only a first portion of the side of catalyst brick 12. Open air space 140 extends over a second portion of the side of catalyst brick 12 between catalyst brick 12 and reformer tube 26 to enable radiative coupling between the catalyst brick and the reformer tube. The amount of insulating mat material 128 compared to the longitudinal extent of air space 140 is chosen to provide the appropriate level of heat transfer from catalyst brick 12 to the reformer tube 26 to maintain the appropriate catalyst temperature.

Further, to enable conductive coupling of the perimeter of catalyst face 13 with reformer tube 26, a highly conducting material 142 (for example a wire rope) replaces a forward portion of material 128. Though FIG. 2 shows facilitation of both conduction and radiation heat transfer from brick 12, conduction-only or radiation-only arrangements are also possible within the scope of the present invention by including only conductive material 142 or only air space 140, respectively.

Figure 3:
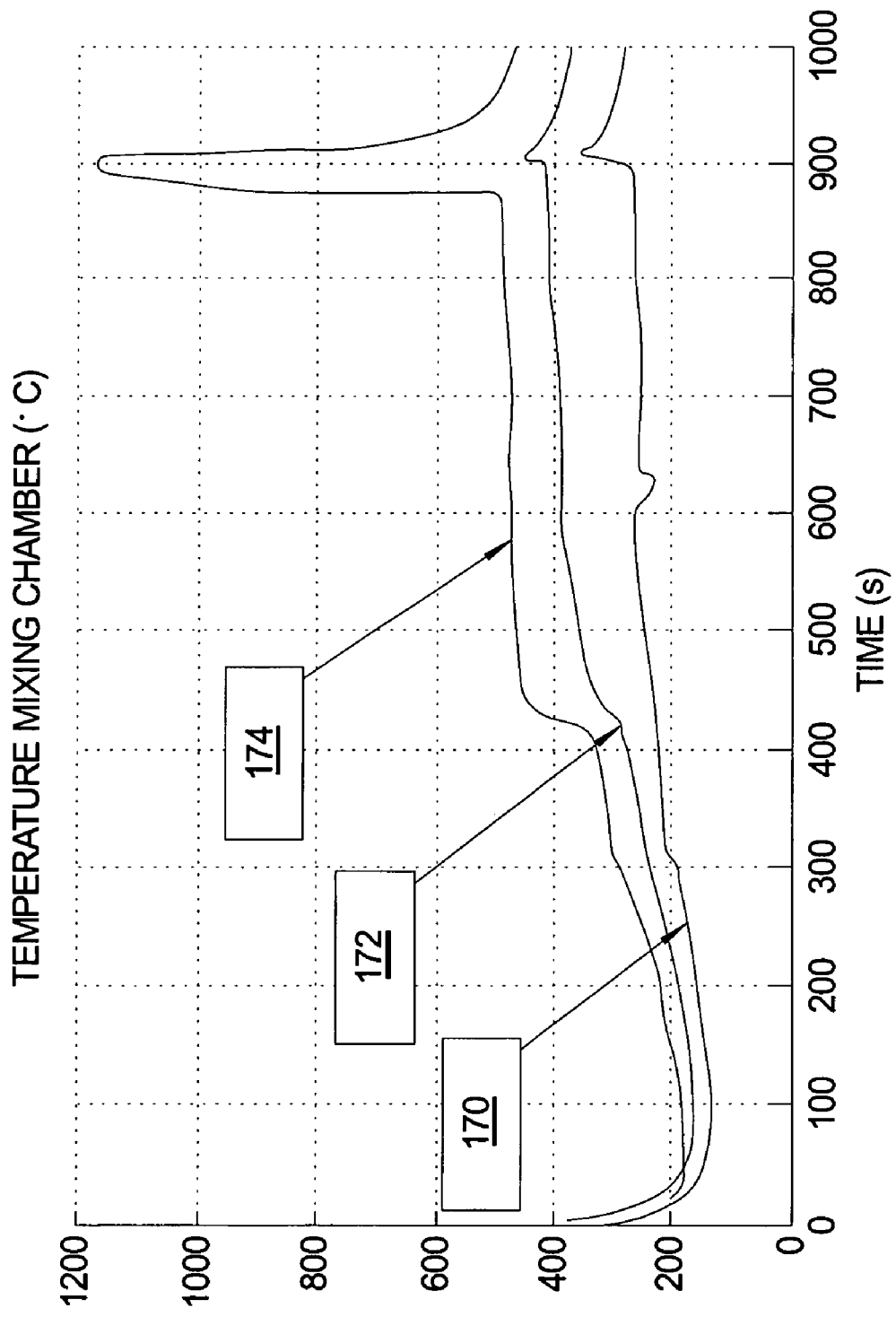
FIG. 3 is a graph showing improved heating of the mixing zone of a reformer equipped in accordance with the present invention.

Referring to FIG. 3, heat-up rate of reformer mixing zone 22 as a function of time from a cold start is shown for the prior art reformer 10 (curve 170); for an improved reformer 110 having only wire rope 142 (curve 172); and for an improved reformer 110 having only radial radiation cooling via air space 140 (curve 174). Both improved embodiments show increased heat up rates of the reformer mixing zone that result in improved reforming efficiency early in the warm-up and reforming process.

Referring again to FIGS. 1 and 2, a further improvement for thermal management of the catalyst brick in accordance with the present invention is shown. In the prior art reformer 10, the incoming air flow 24 gains heat chiefly from heat exchange with hot reformate 16 in heat exchange section 36, which was heretofore thought to be an advantage. By heating the incoming air in this fashion, however, some energy already rejected by the catalyst is recycled back into the front of the reforming catalyst, which impedes the net heat rejection required by the reformer for exothermic partial-oxidation reforming without overheating of the catalyst. In the present invention, air flow 24 gains substantially less heat from the hot reformate in section 36. Although this feature is shown schematically in FIG. 2 by insulation 38 between the reformate gas and the incoming air flow, preferably air flow 24 is simply not conducted through this section of the reformer. More preferably, the reformer is shortened to allow for a more compact reformer design by significantly reducing the length of section 36. Thus, air flow 24 is protected from exposure to reformate heat and is more capable (lower temperature) of convectively cooling the reformer tube wall that is directly coupled to the reforming catalyst by air space 140. The purpose of this convective cooling is both to cool the periphery of the catalyst brick and to enable heat transfer from the catalyst to the reformer mixing zone. Calculations show that the maximum tube wall temperature is reduced by more than 200° C. by such convective cooling without exposure to reformate heat in accordance with the present invention.

In summary, the present invention improves reformer thermal management compared to the prior art. Direct coupling of heat transfer from the catalyst brick rather than the reformate greatly reduces thermal lag as compared to a prior art reformer having a reformate-air heat exchanger. Further, using direct transfer of energy from the catalyst brick by convective cooling by the incoming air enables the air to be an efficient means of net heat rejection necessary from the reformer.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In a catalytic hydrocarbon reformer having a catalytic element disposed within a reformer tube wall and spaced therefrom by a material pad, and having an incoming air flow space outside the reformer tube wall for entry of air to the reformer, and having a mixing zone adjacent the catalytic element for receiving and mixing injected fuel with the incoming air prior to entry of a resulting fuel-air mixture into the catalytic element for generating reformate, the reformer improvement comprising:

a) said material pad extending over only a first portion of the side of said catalytic element adjacent said reformer tube wall; and b) an air gap extending over a second portion of said side of said catalytic element adjacent said reformer tube wall.

2. A reformer improvement in accordance with claim 1 further comprising a thermally-conductive material disposed between said catalytic element and said reformer tube wall over a third portion of said side of said catalytic element.

3. A reformer improvement in accordance with claim 2 wherein said thermally-conductive material is disposed radially adjacent to an entry face of said catalytic element.

4. A reformer improvement in accordance with claim 1 wherein said air flow space is protected from heat from said reformate.

* * * * *